United States Patent Office 2,975,141
Patented Mar. 14, 1961

2,975,141

PREPARATION OF SULFO DETERGENTS

Vsevolod Blinoff, Arnold, and George Braude, Riviera Beach, Md., assignors to American Alcolac Corporation, Baltimore, Md., a corporation of New York No Drawing. Filed Feb. 21, 1957, Ser. No. 641,460

8 Claims. (Cl. 252—161)

This invention relates to a method for the manufacture of alkyl sulfate and alkyl-aryl sulfonate detergent powders, more particularly, the invention provides a process for the production of white powders containing only minor amounts of unsulfated, petroleum ether extractable matter.

Hitherto, dry detergent powders have been most commonly manufactured by the spray-drying or drum-drying of an aqueous slurry or of a solution of the corresponding sulfate or sulfonate which had to be prepared by neutralization of the sulfonic acid or sulfuric acid ester with a metal hydroxide solution.

In this case a substantial amount of water had to be afterwards evaporated from the resulting material causing a consequent increase in costs. Moreover, and as a consequence of the drying procedure discoloration and partial decomposition of the product may occur and a substantial yield loss may result.

A procedure is known according to which a sulfonic acid is neutralized by admixture with an alkali carbonate in the presence of a small amount of water.

The resulting material is homogenized and finally dried to form a powder.

While this procedure might be well usable for chemically stable compounds, such as for instance, alkyl-aryl sulfonates, other compounds, such as fatty alcohol sulfates, are too heat-sensitive to withstand the reactive conditions hereby involved.

A considerable quantity of heat is evolved during the neutralization of the sulfonic acid with a solid alkali carbonate, particularly in the contact areas between the liquid and the solid phase. Moreover, at least a partial decomposition of the sulfates or sulfonates takes place under these conditions and results in dark-colored, moist products of poor storing property and of a high ether-extractable content.

It has now been discovered by the applicants that the neutralization of sulfonic acid and of sulfuric acid esters can be satisfactorily and effectively performed by a treatment with a carbonate or bicarbonate in the presence of powdered dry $CO_2$ which is commercially known as "Dry Ice." Consequently, the invention can be performed by pumping or spraying a sulfonic acid or sulfuric acid ester into a mixing of kneading machine, for instance, into a mixer containing the required amount of powdered carbonate or bicarbonate, admixed with Dry Ice in the form of a powder.

The sulfonic acid or sulfuric acid ester is mixed-in thoroughly and thereby neutralized at a low temperature, the $CO_2$ which is produced simultaneously being liberated as a gas. At the end of the introduction of the acid mixture the material is found to be a more or less viscous paste which at this stage can be easily bleached, by means of a sodium hypochlorite solution.

Instead of introducing the total amount of the carbonate or bicarbonate at once the same can be added gradually, together with Dry Ice, while the sulfonic acid or sulfuric acid ester is run-in. The addition of the Dry Ice may also be performed at intervals without departing from the spirit of this invention.

It has been found that upon continued stirring of the neutralized material, a powder is obtained, which is often fine enough for use in cleaning compositions, or it may be ground or screened as desired, or extruded to produce fine needles.

Since the Dry Ice is added for the purpose of cooling the reaction mixture, its amount depends upon the temperature desired and may vary within wide limits. It was, however, found advantageous to keep the neutralization temperature of alkyl sulfuric acid esters below 10° or 20° C. at all times, to avoid decomposition or hydrolysis and discoloration, thereby to obtain a maximum benefit from this invention.

In the process of this invention, powdered detergents can be prepared from a variety of sulfonic acids or sulfuric acid esters. They can include, for instance, the sulfuric acid esters of lauryl, cetyl or tallow alcohol and in general of any primary or secondary alcohol containing more than 8 carbon atoms in its molecule. Alkyl-aryl sulfonic acids, known for the surface active properties of some of their salts, can also be neutralized effectively by this procedure. Some sulfonic acids or sulfuric acid esters of alcohol-ethers, made from the corresponding alcohols or phenols by reaction with ethylene oxide and sulfation, may also be neutralized by this method. A longer ether chain length seems, however, to favor the formation of soft, or somewhat mushy products after neutralization, instead of the desired dry powders.

The sulfuric acid esters or sulfonic acids to be used in this invention may be obtained from the corresponding alcohols, or alkyl-aryl compounds by methods known to the art. These may include the reaction with sulfuric acid, chlorosulfonic acid, $SO_3$, or other sulfonating agents.

The neutralization agent or base suitable for use for the process of this invention can vary depending on the particular metal salt of the sulfuric acid ester or sulfonic acid desired as final product. Carbonates or bicarbonates of sodium, ammonium, potassium, calcium, or magnesium or mixtures of these may be used successfully. More generally, any alkali, alkaline earth or earth metal carbonate or bicarbonate capable of reaction with the sulfuric acid esters or sulfonic acids employed, can be used for the neutralization without departing from the spirit of this invention.

In most cases an excess of the carbonate or bicarbonate compounds of from 5 to 100 percent of the amount theoretically required to neutralize the sulfuric acid ester or the sulfonic acid can be employed to obtain optimum results. The powders thus obtained will not only be neutral or slightly alkaline, but will also show a dry appearance and have better flow. Some of these carbonates or bicarbonates are also frequently added purposely to detergent formulations and the incorporation of these materials at an early stage of the reaction results in a more homogeneous distribution.

As mentioned above, powdered Dry Ice is used in the process of this invention for cooling the reaction mixture during neutralization. Commercial solid carbon dioxide may be used and added to the carbonate or bicarbonate before or after grinding; it can also be added in the course of the neutralization reaction. However, the effect of the Dry Ice is not only limited to that of a cooling agent. Escaping as gaseous $CO_2$ during and after the neutralization, it entrains part of the water of neutralization produced and some of the volatile portions of the highly undesirable unsulfated or unsulfonated matter present, with the result that an improved finished product will be obtained.

While neutralizing under the conditions described will yield a satisfactory detergent product, a whiter product may be obtained by bleaching with a commercial bleaching solution. Hypochlorite solutions of sodium, potassium, calcium or in general of a metal ion liable to form hypochlorites can be employed successfully, provided the addition is carried out at the pasty stage of the reaction. We prefer to use the hypochlorite based on the same metal as the carbonate or bicarbonate used for neutralization.

The neutralization, which is the most important step in the process of this invention, can be carried out in any machine or apparatus providing an efficient mixing and blending action for a pasty material. A kneader, ribbon mixer or blender is equally well suited for this operation. It does not even have to be provided with a heating or cooling system, as the reaction conditions can be easily adjusted by varying the amount of Dry Ice introduced.

The following examples will illustrate the processes of this invention without, however, restricting it specifically thereto:

Example 1

2,000 lbs. of technical lauryl alcohol are sulfated by reaction with 1,200 lbs. of chlorosulfonic acid at 25 to 30° C. The resulting liquid material, consisting predominantly of the acid-sulfuric acid esters of $C_{12}$ and $C_{14}$ alcohols, is then neutralized in the following way:

1,750 lbs. of powdered sodium bicarbonate are introduced into a 2,000 gallon stainless steel ribbon mixed and 850 lbs. of a finely ground solid $CO_2$ (Dry Ice) are added. After a thorough mixing, the sulfuric acid ester is run into this powder, agitating continuously. A violent evolution of $CO_2$ gas accompanies the acid introduction which takes place at a temperature of 10° C. or less and is completed in 20 to 30 minutes. While the dark yellow to brown paste is stirred continuously, 40 lbs. of a 15 percent solution of sodium hypochlorite in water are added. The mixture turns cream or light tan in color within a few minutes. It is important to introduce the bleach solution soon after the end of the neutralization, while the product is still in paste form, to obtain a uniformly bleached material. Within the next ½ hour to 1 hour, the product becomes harder and finally disintegrates into a white powder. This final material contains about 75 percent sodium alkyl sulfate, 3 percent unsulfated, petroleum ether-extractable material, and about 20 percent sodium bicarbonate, the rest being minor amounts of other mineral salts and water.

It can be blended directly into powdered detergent compositions or ground to a fine free flowing powder, if desired.

Example 2

The liquid material made by sulfating technical tallow alcohol with chlorosulfonic acid and consisting predominantly of the sulfuric acid ester of $C_{16}$–$C_{18}$ alcohols is neutralized with sodium carbonate and Dry Ice and bleached as described in Example 1. A light cream colored powder is thus obtained, which can be used in dry detergent formulations.

Since certain changes in carrying out the above process could be made without departing from the scope thereof, it is intended that all matter contained in the above description shall be interpreted as illustrative and not in a limiting sense.

Having thus described the invention, what we claim as new and desire to be secured by Letters Patent, is as follows:

1. The process of manufacturing detergents by neutralizinig organic sulfoxy acids while avoiding decomposition which comprises forming a mixture of (1) an organic sulfoxy acid selected from the group consisting of alkyl sulfuric acid esters having at least 8 carbon atoms in the alkyl group, and alkyl-aryl sulfonic acids;

(2) comminuted alkaline reacting material having a cation selected from the group consisting of ammonia, alkali metal, and alkaline earth metal; and (3) pulverulent solid carbon dioxide and subjecting the mixture to mixing to neutralize the organic sulfoxy acid and form a dry, pulverulent detergent, the total amount of solid carbon dioxide introduced into the mixture during the process being sufficient to maintain the temperature of the mixture below and about 20° C. and thereby prevent hydrolysis and decomposition of the organic material.

2. The process of claim 1 wherein the alkaline reacting material is carbonate.

3. The process of claim 1 wherein the alkaline reacting material is a bicarbonate.

4. The process of claim 1 wherein the detergent composition is treated with a hypochlorite bleaching agent before the composition becomes completely solid.

5. The process of claim 1 wherein the organic sulfoxy acid is an alkyl sulfuric acid ester having at least 8 carbon atoms in the molecule and the alkaline material is a carbonate.

6. The process of claim 1 wherein the organic sulfoxy acid is an alkyl sulfuric acid having at least 8 carbon atoms in the molecule and the alkaline material is a bicarbonate.

7. The process of claim 5 wherein the detergent composition is treated with a hypochlorite bleaching agent before the composition becomes completely solid.

8. The process of claim 6 wherein the detergent composition is treated with a hypochlorite bleaching agent before the composition becomes completely solid.

References Cited in the file of this patent

UNITED STATES PATENTS

| | | |
|---|---|---|
| 2,320,280 | Kalusdian | Mar. 25, 1943 |
| 2,529,537 | Brod | Nov. 14, 1950 |
| 2,671,797 | Hagerman et al. | Mar. 9, 1954 |
| 2,688,035 | Jacob et al. | Aug. 31, 1954 |
| 2,715,110 | Packard | Aug. 9, 1955 |
| 2,738,365 | Sylvester | Mar. 13, 1956 |

FOREIGN PATENTS

| | | |
|---|---|---|
| 622,728 | Germany | Nov. 5, 1935 |